United States Patent [19]

Suzuki

[11] Patent Number: 4,472,278

[45] Date of Patent: Sep. 18, 1984

[54] SEPARATING DEVICE FOR AN INSULATING GAS-LIQUID TWO PHASE FLUID

[75] Inventor: Makoto Suzuki, Yatabemachi, Japan

[73] Assignees: Agency of Industrial Science & Technology; Ministry of International Trade & Industry, both of Tokyo, Japan

[21] Appl. No.: 424,455

[22] Filed: Sep. 27, 1982

[30] Foreign Application Priority Data

Nov. 18, 1981 [JP] Japan .............................. 56-184709
Nov. 18, 1981 [JP] Japan .............................. 56-184710

[51] Int. Cl.³ ...................... B01D 35/06; B01D 43/00
[52] U.S. Cl. .................................. 210/243; 204/193; 204/242; 204/302
[58] Field of Search ................ 361/212; 210/243, 222, 210/223; 204/193, 242, 302; 55/36, 159

[56] References Cited

U.S. PATENT DOCUMENTS 2,354,553 7/1944 Sherk .................................. 210/243
3,255,571 6/1966 Walker et al. ..................... 210/243

FOREIGN PATENT DOCUMENTS 648267 1/1976 U.S.S.R. .............................. 204/302

OTHER PUBLICATIONS

Abstract 51,002; 370 O.G. 757; Whittington; 24 Sep. 1948.

*Primary Examiner*—Frank Sever
*Attorney, Agent, or Firm*—Schwartz & Weinrieb

[57] ABSTRACT

A gas-liquid separating device wherein electrodes of suitable configuration, such as straight-like, ring-like or wire net-like cylindrical configurations, are disposed along a flow passage of an insulating gas-liquid two-phase fluid to form a high electric field region and a low electric field region within said flow passage to collect the gas phase of the gas-liquid two-phase fluid in said low electric field region.

21 Claims, 12 Drawing Figures

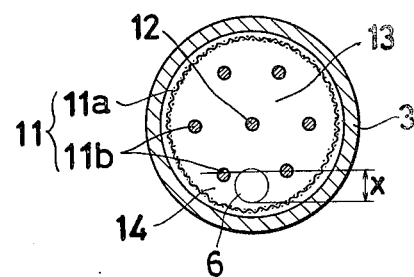
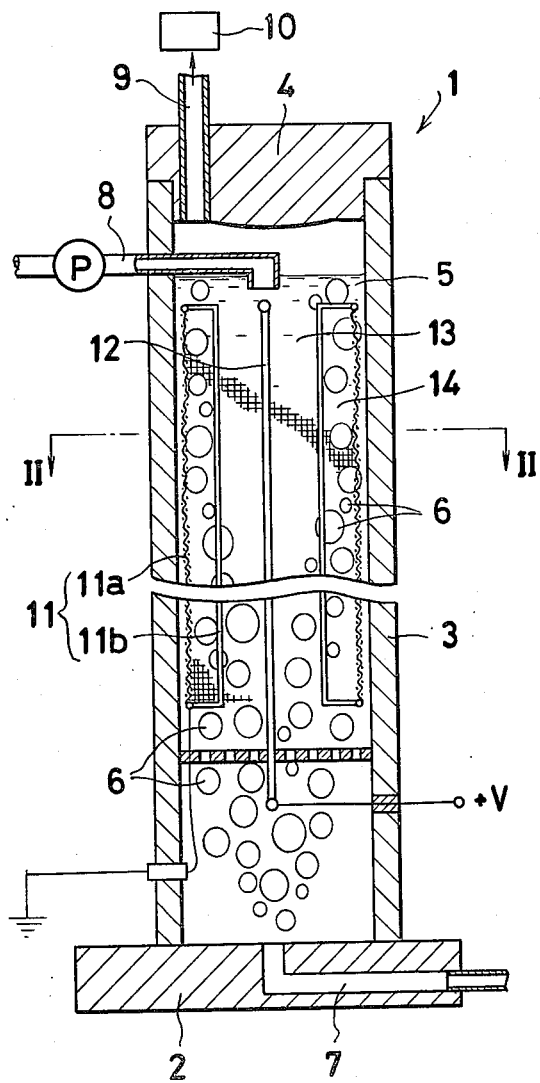
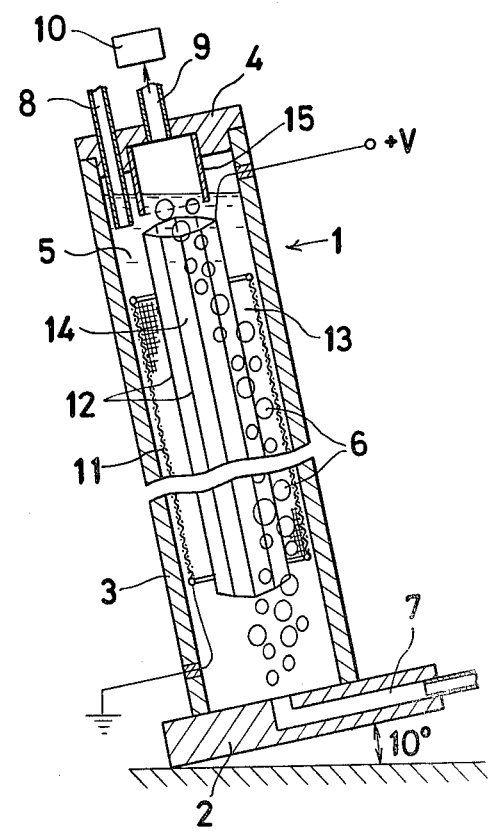

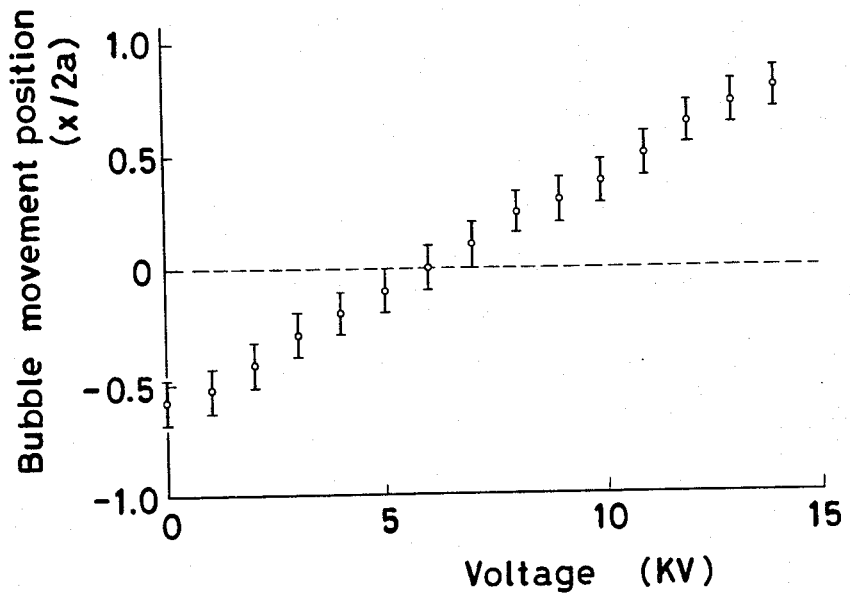
Fig_3
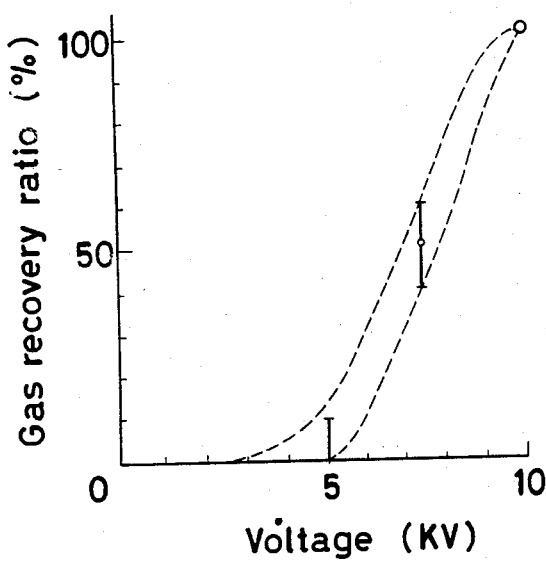
Fig_5
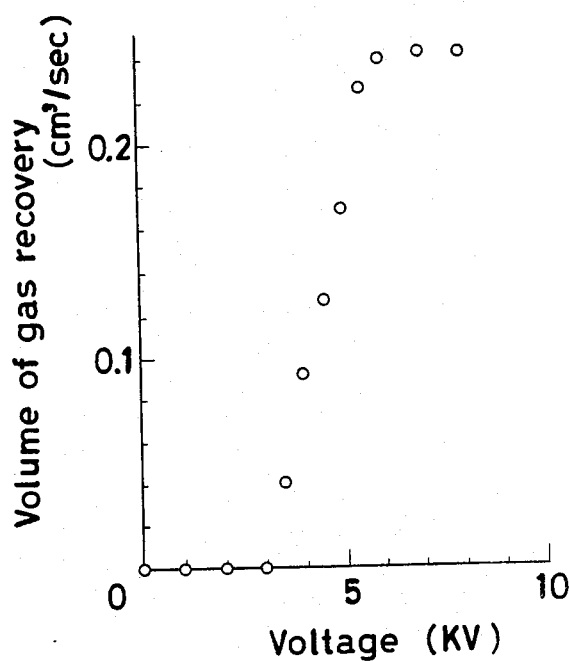
Fig_7

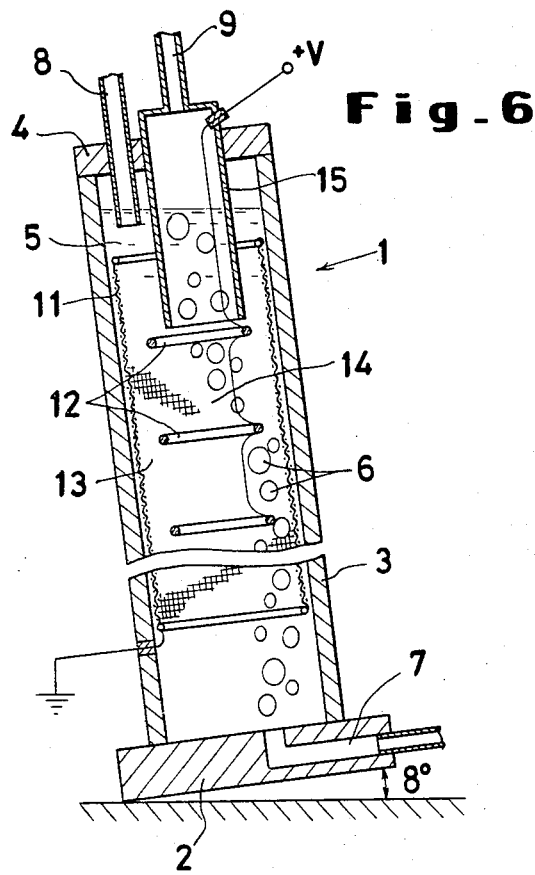
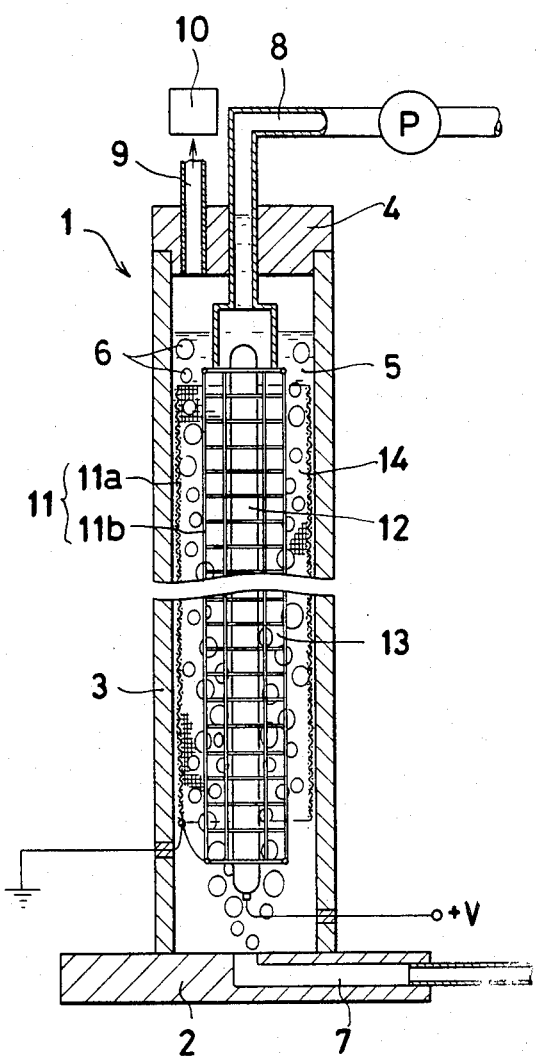
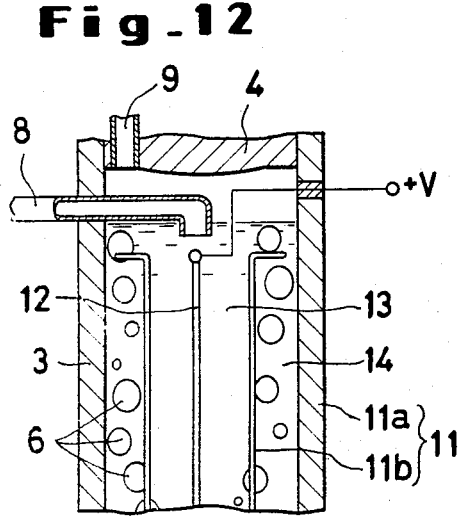

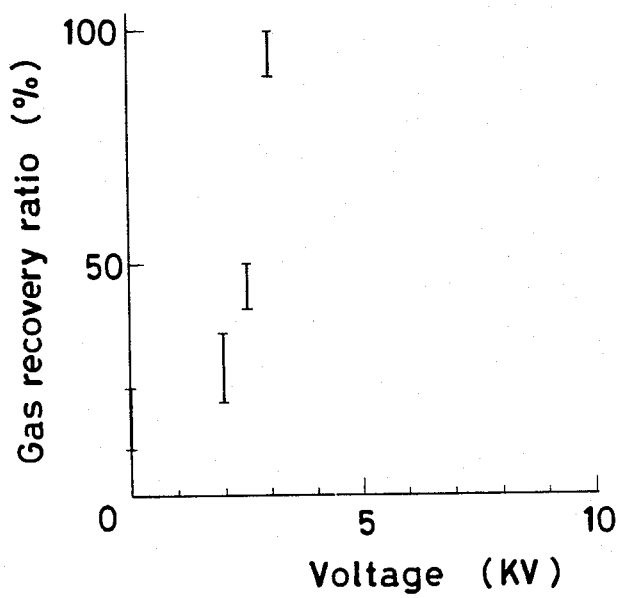
Fig_9
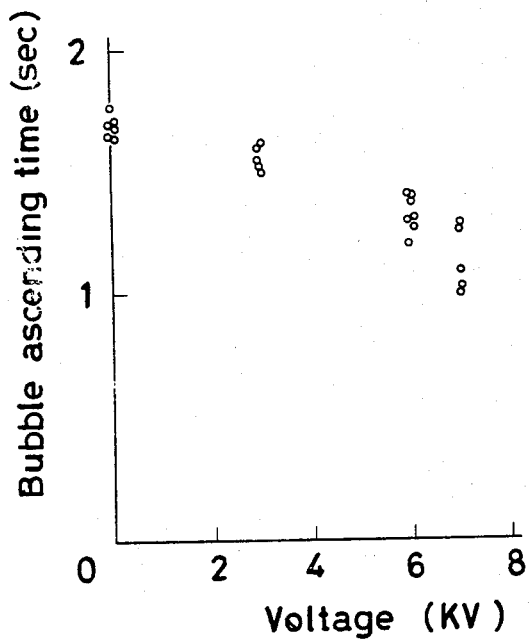
Fig_10
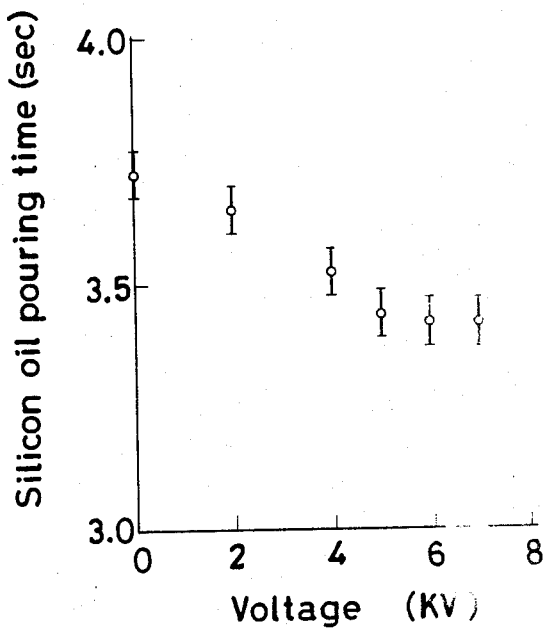
Fig_11

SEPARATING DEVICE FOR AN INSULATING GAS-LIQUID TWO PHASE FLUID

FIELD OF THE INVENTION

This invention relates to a device for separating an insulating gas-liquid two-phase fluid into a gas phase and a liquid phase.

BACKGROUND OF THE INVENTION

Insulating gas-liquid two-phase fluids are used in heat transmission systems, cooling systems and transporting systems for liquid fuels used for space rockets, and the accurate control of their flow rate is required.

The gas-liquid two-phase fluid is very complicated as compared with a single-phase fluid, and the control performance thereof is materially decreased if a mechanism, such as a pump or a valve, employed for a single-phase fluid is used. Thus, if the two-phase fluid can be efficiently separated into a gas phase and a liquid phase, efficient use of conventional mechanisms for the single-phase fluids is made possible. No practical gas-liquid separating device has yet been developed.

In the circumstances, mechanisms such as pumps, pipe lines, valves, and the like, for single-phase fluids are used for gas-liquid two-phase fluids, after the characteristics thereof have been examined, and the lowering of performance is ignored.

Moreover, in lengthy pipe lines for liquid nitrogen and liquid helium for cooling low temperature devices, bubbles sometimes occur as a result of the vaporization of the liquids at a portion where much heat is absorbed, making it impossible to stably supply the liquids. In such a case, if the gas phase is separated from the liquid phase to change the nature of the two-phase fluid, it is possible to stabilize the flow. A gas- liquid separating device is thus necessary in the pipeline system.

OBJECT OF THE INVENTION

The present invention has been achieved in view of the circumstances as noted above. An object of the invention is to provide a separating device for an insulating gas-liquid two-phase fluid which is simple in construction and easy to operate.

SUMMARY OF THE INVENTION

To achieve the above-described object, the present invention provides a separating device for an insulating gas-liquid two-phase fluid which is characterized in that electrodes of suitable configuration, such as straight-like, ring-like or wire net-like configuration, are disposed along a flow passage of the insulating gas-liquid two-phase fluid, and a high electric field region and a low electric field region are provided within said flow passage to collect the gas phase of said insulating gas-liquid two-phase fluid on the side of said low electric field region.

Therefore, since in accordance with the present invention it is only necessary to dispose the electrodes along the flow passage of the gas-liquid two-phase fluid, the construction of the separating device is simple and no movable parts are required. Because of this, maintenance is easy and reliability high. Furthermore, the liquid phase in the high electric field region contains no gas phase, and therefore, the two phases can be separated readily and completely.

BRIEF DESCRIPTION OF THE DRAWINGS

Other objects and features of the present invention will become apparent from the ensuing detailed description in connection with the accompanying drawings wherein:

FIG. 1 is a sectional view showing a first embodiment of the gas-liquid two-phase fluid separating device in accordance with the present invention.

FIG. 2 is a sectional view taken along line II—II of FIG. 1.

FIG. 3 is a graph showing the relation between the radial position of bubble movement and the applied voltage in the separating device.

FIG. 4 is a sectional view showing a second embodiment of the gas-liquid two-phase fluid separating device in accordance with the present invention.

FIG. 5 is a graph showing the relation between the gas recovery ratio and the applied voltage in the second embodiment.

FIG. 6 is a sectional view of a third embodiment of the gas-liquid two-phase fluid separating device in accordance with the present invention.

FIG. 7 is a graph showing the relation between the volume of gas recovered and the applied voltage in the third embodiment.

FIG. 8 is a sectional view showing a fourth embodiment of the gas-liquid two-phase fluid separating device in accordance with the present invention.

FIG. 9 is a graph showing the relation between the gas recovery ratio and the applied voltage in the fourth embodiment.

FIG. 10 is a graph showing the relation between the bubble ascending time in the liquid phase and the applied voltage.

FIG. 11 is a graph showing the relation between the pouring time of a liquid into the device and the applied voltage.

FIG. 12 is a sectional view of the essential part of a fifth embodiment of the gas-liquid two-phase fluid separating device in accordance with the present invention.

DESCRIPTION OF THE PREFERRED EMBODIMENTS

FIG. 1 shows a first embodiment of a gas-liquid two-phase fluid separating device in accordance with the present invention. A separating device generally designated by 1 has a cylinder 3 formed of an insulating material which constitutes a part of the flow passage of the two-phase fluid. The lower end of the cylinder 3 is closed by a base plate 2 in a fluid-tight manner and the upper end thereof is closed by a lid 4 in an air tight manner. A supply pipe 7 for supplying the two-phase fluid into the cylinder 3 is provided in the base plate 2, a discharge pipe 8 for discharging the separated liquid from the cylinder 3 to the outside is provided in the upper portion of the cylinder 3, a discharge pipe 9 for discharging gas separated within the cylinder 3 is provided to extend air-tightly through the lid 4 with one end thereof opening into the interior of the cylinder and the other end thereof being connected to a gas flow meter 10.

A ground electrode 11 and a high voltage electrode 12 are disposed within the cylinder 3. In this embodiment, the ground electrode 11 comprises a cylindrical electrode 11a formed of, for example, a 20-mesh brass wire net provided on the inner peripheral surface of the cylinder 3 and, for example, six copper rod-like electrodes 11b of a diameter 1 mm provided internally of the cylinder 3 in an equally pitched relation, as shown in FIG. 2. The high voltage electrode 12 is in the form, for example, of a copper rod of a diameter 1 mm disposed at the center of the circle defined by the six grounded electrodes 11b within the cylinder 3 (FIG. 2). A voltage up to 15 kV is applied to the high voltage electrode 12, and the ground electrode 11 is grounded. Accordingly, a high electric field region 13 is formed between the high voltage electrode 12 and the ground electrode 11 and a low electric field region 14 is formed between the ground electrode 11b and the cylinder 3.

In the separating device 1 constructed as described hereinbefore, when an insulating gas-liquid two-phase fluid is supplied into the cylinder through the supply pipe 7, bubbles 6 of the gas contained in the two-phase fluid move upward within the cylinder from the opening therein. As the bubbles 6 move up, they are collected in the low electric field region 14. That is, the gas phase 6 is separated from the liquid phase 5. The gas phase 6 is recovered at the discharge pipe 9 provided in the low electric field region 14 whereas the liquid phase 5 is discharged through the discharge pipe 8 which opens into the high electric filed region 13. There are two reasons why the gas phase is separated from the liquid phase as described above, depending on the conditions of the high electric field region 13 and the low electric field region 14. One reason is that in the case the intensity of the electric field between the high electric field region 13 and the low electric field region 14 varies spatially, the bubbles, which are small in dielectric constant, receive a force urging them towards the region of weaker electric field. In this case, the force F exerted on the bubbles is obtained by the equation (1) below:

$$F = 2\pi a^3 \frac{\epsilon_1(\epsilon_2 - \epsilon_1)}{\epsilon_1 + 2\epsilon_1} \nabla (E^2) \quad (1)$$

where "a" is the radius of the bubble, $\epsilon_1$ is the dielectric constant of the liquid, $\epsilon_2$ is the dielectric constant of the gas, and E is the intensity of the electric field.

Thus, in the case the bubbles 6 are present in the liquid phase 5 and the aforementioned high electric field region 13 and low electric field region 14 are present within the liquid phase, the bubbles are moved towards the region of weaker electric field by the force F, as a consequence of which the liquid phase is separated from the gas phase.

When there is no continous spacial variation in the intensity of the electric field between the high electric field region and the low electric field region and the two regions are adjacent to the electrode as a boundary, pressure $E_H$ of the liquid phase in the high electric field region becomes higher than pressure $E_L$ of the liquid phase in the low electric field region in terms of the static electricity and fluid mechanics. Thus, if the bubbles are present in the liquid phase, they receive a force urging them towards the liquid phase in the low electric field region low in pressure. In this case, the pressure difference $\Delta P$ between the regions is obtained by equation (2) below:

$$\Delta P = P_H - P_L = \tfrac{1}{2} \rho (\partial \epsilon / \partial \rho)_T (E_H^2 - E_L^2) \quad (2)$$

where $\rho$ is the density of the liquid phase, $\epsilon$ is the dielectric constant, and T is the temperature.

Thus, when the bubbles 6 are present in the liquid phase 5 and the bubbles reach the boundary between the high electric field region 13 and the low electric field region 14, they are forced towards the low electric field region by the pressure difference $\Delta P$ between the regions, as a consequence of which the liquid phase is separated from the gas phase.

The phenomenon wherein the gas phase is separated from the liquid phase varies theoretically depending on the conditions in which the high electric field region and the low electric field region are formed, and actually, it is considered that one or the other of these phenomena will be pronounced depending on the condition of the boundary between the regions. However, it is difficult to definitely discriminate which phenomena appears to what extent, and both phenomena are interdependently exerted so that the gas phase is moved towards the low electric field region.

FIG. 3 is a graph showing the radial position to which the bubbles 6 ascending within the liquid are moved towards the low electric field region 14. The high voltage electrode and the ground electrode were disposed within a cylinder of synthetic resin having an inside diameter 30 mm and length 200 mm as shown in FIG. 1, and silicon oil (1 CS) and air at the flow rate of 0.6 l/min. and 0.1 l/min., respectively, were supplied into the cylinder form the central lower part thereof, and the radial position of the bubbles within the cylinder was measured at 100 mm height from the bottom of the cylinder while changing the applied voltage to the high voltage electrode from 0 to 15 kV. It is found from the graph of FIG. 3 that when the voltage was not applied to the electrode, the bubbles moved up in the vicinity of the central portion of the cylinder; when a voltage of 5 kV was applied to the high voltage electrode, the bubbles moved up at a distance of more than 5 mm from the electrode 12 at the height of more than 100 mm from the lower portion of the cylinder; and when the voltage 15 kV was further applied, the bubbles moved up at a distance of 10 mm from the electrode 12 at the aforementioned height. It was ascertained from the foregoing that the bubbles supplied together with the liquid within the cylinder change in position wherein they are moved towards the low electric field region depending on the change in intensity of the electric field.

It is an essential condition that the gas-liquid two-phase fluid to be separated by the device of the present invention must have an insulating property wherein almost no current flows because a high voltage is applied thereto. Specific examples of such a gas-liquid two-phase fluid include coolants such as liquid nitrogen for cooling low temperature devices including bubbles produced by heating, and liquid fuels used for rockets or the like, and the separation of the gas phase from the liquid phase provides a stable cooling effect or combustion effect.

FIG. 4 shows a second embodiment of the gas-liquid separating device in accordance with the present invention. This gas-liquid separating device 1 comprises a cylindrical electrode formed from a brass wire net as the ground electrode 11 and eight copper rods disposed in an equally spaced relation as the high voltage electrode 12. In this embodiment, the high electric field region 13 is formed in the neighborhood of the ground electrode, and the low electric field region 14 is formed internally of the high voltage electrode 12. Thus, the discharge pipe 9 for discharging gas is provided in the center of the cover 4, and the liquid discharge pipe 8 is provided about the cylinder 3.

In the gas-liquid separating device having the construction as described above, when the gas-liquid two-phase fluid is supplied from the center of the bottom of the cylinder 3, the bubbles 6 ascend along the low electric field region 14 within the high voltage electrode 12, which is the shortest distance, and the effect of the invention may not be assured definitely. Therefore, the cylinder 3 was disposed inclinded by about 10 degrees with respect to the ground as shown, and the two-phase fluid was supplied from the supply pipe 7. The bubbles within the liquid ascend along one side wall as shown since the cylinder is inclined but the action of the force F in the aforesaid equation (1) is mainly exerted on the bubbles, which are gradually collected internally of the high voltage electrode 12. The collection rate of bubbles may assume substantially 100% by selection of the voltage applied to the high voltage electrode 12 as shown in the graph of FIG. 5. That is, a cylindrical partitioning wall 15 is projected from the lower surface of the cover 4 to selectively recover the bubbles ascending internally of the high voltage electrode 12 from the gas discharge pipe 9, and the collection rate of bubbles relative to the applied voltage was measured by the gas flow meter 10. It is apparent from the graph that when the applied voltage exceeded 5 kV, the recovery rate of bubbles rapidly increased and when the applied voltage of the high voltage electrode 12 assumed 10 kV, substantially 100% of the bubbles were recovered.

FIG. 6 shows a third embodiment of the gas-liquid separating device in accordance with the present invention. The ground electrode 11 positioned in the vicinity of the inside wall of the cylinder 3 comprises, for example, a 20-mesh cylindrical brass wire net, and the high voltage electrode 12 comprises a plurality of copper rings of a thickness 1 mm$\phi$ and a diameter 18 mm disposed coaxially in a spaced relation internally of the ground electrode 11. In this case, the low electric field region 14 is formed internally of the high voltage electrode 12 and the high electric field region 13 is formed on the inner peripheral surface of the cylinder.

The cylinder of the gas-liquid separating device having the construction as described hereinbefore was disposed inclined by about 8 degree with respect to the ground, similarly to the second embodiment, and a gas-liquid two-phase fluid wherein air was blown into water at the rate of about 0.24 cm$^3$/sec. was supplied through the supply pipe to ensure the effect of the present invention. That is, when the gas-liquid two-phase fluid was supplied into the cylinder 3 through the pipe 7, the bubbles 6 in the two-phase fluid blown from the pipe 7 ascend along one side within the cylinder since the cylinder was inclined but the action of the force F in the aforesaid equation (1) was mainly exerted on the bubbles, which were gradually moved internally of the high voltage electrode 12. The recovery of bubbles in this embodiment is as shown in the graph of FIG. 7. When the voltage applied to the high voltage electrode 12 exceeded 3 kV, the bubbles began to be concentrated on the low electric field region 14, and when it assumed 6 kV, the bubbles contained in the liquid were concentrated in the low electric field region 14 to recover substantially 100% thereof.

FIG. 8 shows a fourth embodiment of the gas-liquid separating device in accordance with the present invention. On the inner peripheral surface of the cylinder 3 is disposed a wire net 11a of about 20-mesh, and a cylindrical wire net electrode 11b of 5 mesh is disposed internally of the first mentioned wire net 11a. These cylindrical wire nets constitute a ground electrode 11.

An iron rod 12 is used as the high voltage electrode which is arranged at the center of the ground electrode 11b. When a high voltage is applied to the rod-like electrode 12, the high electric field region 13 is formed between the high voltage electrode 12 and the ground electrode 11b, and the low electric field region 14 where little electric field is present is formed between the two cylindrical wire net-like electrodes.

When the gas-liquid two-phase fluid is supplied into the cylinder of the gas-liquid separating device in this embodiment through the supply pipe 7 provided on the bottom, as the bubbles of the two-phase fluid ascend, the pressure difference $\Delta P$ shown in the equation (2) between the high electric field region 13 and the low electric field region 14 is mainly exerted thereon so that the bubbles are moved towards the low electric field region and recovered by the pipe 9 provided on the low electric field region 14.

The gas-liquid separating device shown in FIG. 8 was conducted as follows. On the inner peripheral surface of a synthetic resin cylinder having an inside diameter of 30 mm were arranged a 20-mesh cylindrical brass wire net electrode as the ground electrode 11a, a 5-mesh cylindrical copper wire net electrode having a diameter of 18 mm as the ground electrode 11b, and an iron rod having a diameter of 8 mm as the high voltage electrode 12, and the cylinder 3 was filled with silicon oil, after which air was blown therein through the pipe at the bottom at the rate of about 0.1 l/min. to measure the recovery rate of gases recovered in the low electric field region by varying the intensity of electric field. The result is as shown in the graph of FIG. 9, and it is found therefrom that when the applied voltage was 0 V, the recovery rate was about 20%, but when the applied voltage was set to 3 kV, the gases were recovered substantially completely.

Further, on the inner peripheral surface within an acryl cylinder of an inside diameter of 12 mm and a length of 500 mm were disposed four copper rod-like electrodes as the high voltage electrodes and in the center thereof was disposed a single copper rod-like electrode as the ground electrode. The cylinder was filled with silicon oil and air was blown from the bottom of the cylinder at the rate of 2.8 l/min. to measure the relation between the time during which bubbles ascended 400 mm and the applied voltage. The result is as shown in the graph of FIG. 10 and it is found therefrom that when the applied voltage was 0 V, the ascending time of the bubbles was more or less 1.7 sec. but when a voltage of 6 kV was applied to the high voltage electrode, the ascending time was shorter, i.e., 1.3 sec.

Also, the bottom of the cylinder was made to open and silicon oil was poured therein while air was blown at the rate of 4.5 l/min. from the top of the cylinder to ensure that the bubbles flow down with silicon oil, after which the relation between the time during which 0.0665 l of silicon oil was poured into the cylinder and the applied voltage was measured. The result is as shown in FIG. 11 and it is found therefrom that if the voltage was not applied to the high voltage electrode, the pouring time required was about 3.7 seconds whereas when a voltage of 5 kV was applied to the high voltage electrode, it was cut down to about 3.45 seconds.

It has been ascertained from the aforementioned two experiments that the gas-liquid separating device in accordance with the present invention not only provides the separation of the gas phase from the liquid phase but controls the flow resistance of the gas-liquid two-phase fluid.

In case where the separating device has the inner circumferential surface of the cylinder 3 provided with the ground electrode 11, the cylinder 3 itself may be used as the ground electrode, as shown in FIG. 12, by forming it of a conductive material such as steel, copper, etc.

As is apparent from the foregoing, the gas-liquid separating device of the present invention can separate the gas phase from the liquid phase by the mere provision of the electrodes so that the high electric field region and low electric field region are formed along the flow passage of the gas-liquid two-phase fluid, and the device includes no movable parts and thus the construction thereof is simple, whereby the separation may be effected positively irrespective of the gravitational direction. Moreover, the device can control the flow resistance of a gas-liquid two-phase fluid and therefore, is also capable of controlling the rate of such fluids. The high voltage is applied to the electrode in order that the high and low electric field regions may be formed in the flow passage but the liquid phase has an insulating property and thus only a little current flows thereinto, as a consequence of which the amount of electric power consumed is extremely small.

Obviously, many modifications and variations of the present invention are possible in light of the above teachings. It is therefore to be understood that within the scope of the appended claims, the present invention may be practiced otherwise than as specifically described herein.

What is claimed is:

1. A device for separating an insulating gas-liquid two-phase fluid into a gas phase and a liquid phase comprising:
   means defining a flow passage for an insulating gas-liquid two-phase fluid;
   a high-voltage electrode and a ground electrode provided along said flow passage for said gas-liquid two-phase fluid;
   a high voltage power source;
   said high voltage electrode being connected to said high voltage power source, and said ground electrode being grounded, so as to thereby form a high electric field region and a low electric field region within said flow passage for separating said two-phase fluid into said gas and liquid phases;
   means for introducing said insulating gas-liquid two-phase fluid into said flow passage;
   a liquid phase discharge means provided within said high electric field region for collection of only said liquid phase from said flow passage; and
   a gas phase discharge means provided within said low electric field region for collection of only said gas phase from said flow passage,
   whereby once said gas and liquid phases have been separated within said flow passage, only separated gas and liquid phases are removed from said flow passage.

2. The separating device according to claim 1, wherein the gas-liquid two-phase fluid is formed in a cylinder made of a conductive material, and said cylinder is used as the ground electrode.

3. The separating device according to claim 1, wherein the ground electrode comprises two cylindrical wire net electrodes of different diametrical sizes disposed coaxially along the flow passage, the high voltage electrode is disposed internally of the smaller cylindrical wire net electrode, the high electric field region is formed between the high voltage electrode and the smaller cylindrical wire net electrode, and the low electric field region is formed in the neighborhood of said large cylindrical wire net electrode.

4. The separating device according to claim 1, wherein the ground electrode comprises a plurality of rods arranged in an equally spaced relation circumferentially about the flow passage, the high voltage electrode is disposed internally of said ground electrode, the high electric field region and the low electric field region are formed internally and externally, respectively, of said ground electrode.

5. The separating device according to claim 1, wherein the ground electrode comprises a cylindrical electrode disposed along the flow passage, the high voltage electrode is disposed internally of said ground electrode, and the low electric field region and the high electric field region are formed internally and externally, respectively, of said high voltage electrode.

6. The separating device according to claim 5, wherein the high voltage electrode comprises a plurality of rods arranged in an equally spaced relation circumferentially about said flow passage and the low electric field region is formed internally of said plurality of rod-like electrodes.

7. The separating device according to claim 5, wherein the high voltage electrode comprises a plurality of concentrically arranged rings, and the low electric field region is formed internally of said plurality of ring-like electrodes.

8. The separating device according to any one of claims 1 and 3-7, wherein a voltage of 2 to 15 kV is applied to the high voltage electrode from said high voltage power source.

9. The separating device as set forth in claim 7, wherein:
   said concentrically arranged rings are axially spaced along said flow passage.

10. The separating device as set forth in claim 1, wherein:
    said means for introducing said two-phase fluid into said flow passage is fluidically connected to the lower region of said flow passage.

11. The separating device as set forth in claim 1, wherein:
    said liquid phase discharge means and said gas phase discharge means are fluidically connected to the upper region of said flow passage.

12. The separating device as set forth in claim 1, wherein:
    said flow passage is inclined with respect to a vertical plane so as to enhance said separation of said liquid and gas phases.

13. The separating device as set forth in claim 1, wherein:
    said means for introducing said two-phase fluid into said flow passage is connected to one end of said flow passage; and
    said gas phase discharge means and said liquid phase discharge means are connected to the opposite end of said flow passage.

14. The separating device as set forth in claim 1, wherein:

said liquid phase discharge means comprises a discharge pipe having its end submerged beneath the surface of said liquid phase of said two-phase fluid.

15. The separating device as set forth in claim 1, wherein:

said flow passage is disposed vertically.

16. The separating device as set forth in claim 1, wherein:

said means defining said flow passage comprises an insulative cylinder.

17. The separating device as set forth in claim 16, wherein:

said high voltage electrode is disposed internally within said ground electrode; and said ground electrode is interposed between said high volatge electrode and said insulative cylinder.

18. The separating device as set forth in claim 1, wherein:

said high voltage electrode is disposed internally within said ground electrode.

19. The separating device as set forth in claim 1, wherein:

said high voltage electrode comprises a rod disposed coaxially within said flow passage; and said ground electrode comprises a cylindrical net.

20. The separating device as set forth in claim 1, wherein:

said high voltage electrode comprises a rod disposed coaxially within said flow passage; and said ground electrode comprises a cylindrical net disposed within the peripheral area of said flow passage, and a pluralty of rods circumferentially disposed about said high voltage electrode rod.

21. The separating device as set forth in claim 1, wherein:

said high voltage electrode comprises a rod disposed coaxially within said flow passage; and said ground electrode comprises a plurality of rods circumferentially disposed about said high voltage electrode rod.

* * * * *